Patented Dec. 15, 1953

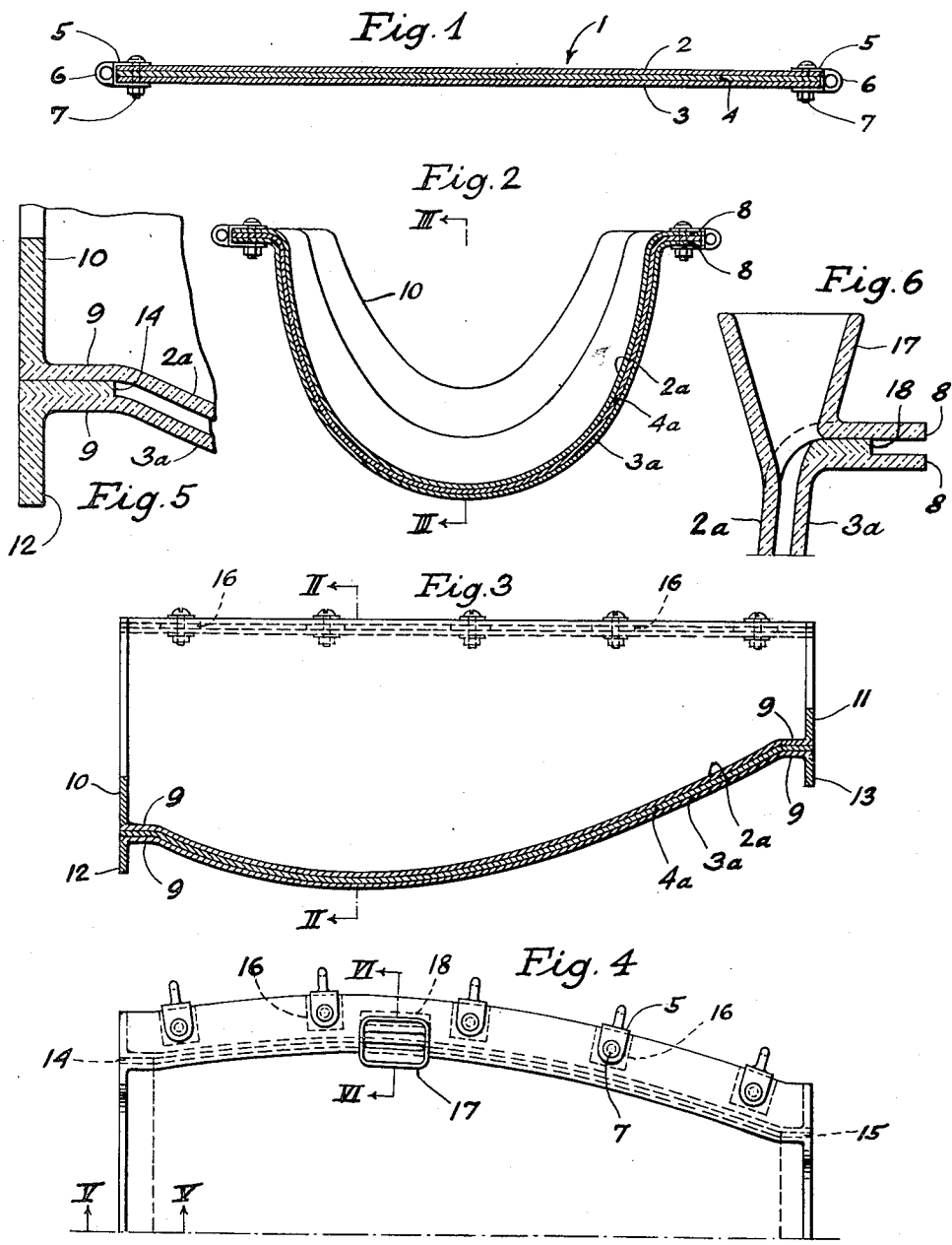

2,662,248

UNITED STATES PATENT OFFICE 2,662,248

METHOD OF FORMING MOLDS FOR CASTING THERMOSETTING TRANSPARENT ENCLOSURES

Robert S. Ames, Akron, Ohio, assignor to Goodyear Aircraft Corporation, Akron, Ohio, a corporation of Delaware Application February 10, 1951, Serial No. 210,423

2 Claims. (Cl. 18—47.5)

This invention relates to a method of making relatively inexpensive molds for casting thermosetting resins into canopy shapes for transparent aircraft enclosures and in particular to the making of molds made of thermoplastic sheet material transparent for ultraviolet light.

This application is a continuation-in-part of my copending application, Serial No. 149,132, filed March 11, 1950, under the same title now abandoned.

Heretofore, male and female casting molds for producing thin-walled castings of thermosetting resins have been made separately and independently of each other, whereby considerable and costly work was involved in order to produce a mold from which articles as, for instance, airplane canopies could be cast in uniform thickness to avoid optical distortion.

It is the general object of the invention to avoid and overcome the foregoing and other difficulties of and objections to prior art practices by the provision of forming in a single operation both the male and female part of a mold made of thermoplastic material for casting in uniform thickness and with perfectly smooth surfaces canopy-like products for aircraft and other purposes.

Another object of the invention is the method of producing a mold, made of thermoplastic material transparent to ultraviolet rays, which requires a minimum of labor and at the same time assures accurate workmanship for producing articles of high optical quality at relatively low cost.

The aforesaid objects of the invention, and other objects which will become apparent as the description proceeds, are achieved by assembling a laminate consisting of two outer sheets made of thermoplastic material of which at least one must be transparent to ultraviolet light as, for instance, polymethyl methacrylate known as Plexiglas or Lucite, and of an inner sheet of the same or similar material for keeping the outer sheets a desired distance apart. However, before assembling of the laminate takes place, to be sure that the sheets will not stick together in forming, at least one of each two sheet surfaces facing each other is provided with a thin suitable anti-adhesive coat or film. Then the sheets are heated to forming temperature and assembled into laminate form as above described. The laminate is then held together along at least certain of its edges and the complete laminate is formed by free-blowing or centrifugally into a compound curved assembly. When the assembly is cooled, the inner sheet is removed, and the outer sheets, spaced a distance equal to the thickness of the removed inner sheet, then form the male and female mold parts for casting canopies and the like, made from thermosetting resin, which, when polymerized and hardened by ultraviolet light passing through the mold, assume a polished surface similar to that of the mold.

For a better understanding of the invention reference should be had to the accompanying drawing, wherein:

Fig. 1 is a cross-sectional view of a laminated flat sheet assembly tailored to proper size for heating and forming.

Fig. 2 is a cross-sectional view of the laminate after being formed into a male and female mold parts for casting an airplane canopy with the spacer still in place and provided with rib reinforcements.

Fig. 3 is a longitudinal cross-sectional view taken on line III—III of Fig. 2.

Fig. 4 is a top view of the male-female mold assembled for casting.

Fig. 5 is a detail in larger scale in cross-section taken on line V—V of Fig. 4.

Fig. 6 is a cross-sectional view of a detail taken on line VI—VI of Fig. 4.

With specific reference to the drawing, Fig. 1, the numeral 1 indicates in general a laminate comprising the outer sheets 2 and 3, made of thermoplastic material, preferably methyl methacrylate, for example, sold under the trademarks Plexiglas or Lucite, and of a spacer sheet 4 of the same or similar material. The sheets, prior to assembling, to prevent their sticking together, are provided with a thin coat of an inert anti-adhesive, for instance, silicones resin obtainable on the market, which may be sprayed on in form of an aqueous dispersion or wiped on in undiluted form before separately heating the sheets to forming temperature. Other inert anti-adhesives, such as stearic acid, zinc stearate, or aluminum stearate in powder form may be applied instead. After heating the sheets they are assembled into a laminate and held together along at least certain of its edges, for example, by a plurality of U-shaped clips 5 provided with eye extensions 6 and by bolts 7 to prevent shifting during handling. Thus, the laminate is ready to be formed into the desired shape by an apparatus for either free-blowing as shown in Patent No. 2,440,499, or a centrifugally operated apparatus as shown in Patent No. 2,488,492 or 2,488,294, whereby the sheets 2, 3 and 4 assume the shapes 2a, 3a and 4a respectively, with stiffening flanges 8 and 9 formed along their longitudinal and transverse edges as shown in Figs. 2 and 3. After cooling, the mold parts 2a and 3a, with the spacer sheet 4a still in place, may be provided, if necessary, with transverse stiffening ribs 10, 11, 12 and 13, to which more ribs may be added, depending on the size of the mold and the thickness of the sheet material used. The ribs, which advantageously are made of the same material as the molds are cemented thereto so that the male and female mold parts will keep their shape after the center or spacer sheet 4a has been removed. To complete the mold, liners 14 and 15 having the thickness of the spacer sheet 4a are then cemented to the transverse flanges 9 of either the male or female mold part to space these parts the proper distance from each other and also to close at the same time the front and rear end of the mold. In addition, liners or spacer pieces 16 spaced from each other are cemented to the longitudinal flanges 8 of either the male or female mold where they are held together by the clips 5 and bolts 7. The openings left between the spacers will permit the air to escape from the mold when pouring the resinous casting material into it through one or more funnels 17 attached to the mold part 2a, Figs. 4 and 6. To prevent escape of the resin through the space between the mold parts when filling the mold a closing strip 18 along the width of the funnel is cemented to the flanged portion of the female mold part.

It will be recognized that a casting mold, made according to the method described above, will achieve all objects mentioned, for its cooperating male-female mold parts are formed together, with a spacer sheet therebetween, so that necessarily both mold parts after having been formed with the spacer sheet removed and reassembled for use will produce a casting of substantially uniform thickness and smooth surfaces of optically high quality. It will be understood that the polymerizable resin used in the mold is of the type to be activated, that is, polymerized by ultraviolet light passed through the mold walls with the entire operation proceeding at substantially room temperature.

While certain representative embodiments and details have been shown for the purpose of illustrating the inventions, it will be apparent to those skilled in this art that various changes and modifications may be made therein without departing from the spirit or scope of the invention.

What I claim:

1. That method of making simultaneously a male-female mold for casting an oblong, streamlined, aircraft canopy from thermosetting resin including the steps of providing at least one of each two contacting surfaces of three sheets of thermoplastic material to be assembled into a laminate, at least one outer sheet of which is transparent to ultra-violet light, with a thin coat of an inert anti-adhesive, heating the sheets to proper forming temperature, assembling the sheets into the laminate, holding the laminated sheets together along their edges against shifting, forming the laminate to the desired shape with flanges along the edges thereof, cooling the formed laminate, reinforcing at least the edges of the outer sheets with ribs to prevent deformation, removing the inner sheet, reassembling the reinforced outer sheets by attaching peripheral spacer elements of the thickness of the removed sheet to the inner surface of one of said reinforced sheets, superimposing the second reinforced sheet on said spacer element and attaching it thereto to form a mold for casting a canopy substantially identical in shape and thickness to the removed inner sheet.

2. That method of making simultaneously a male-female mold for casting an aircraft canopy from thermosetting resin including the steps of providing at least one of each two contacting surfaces of three sheets of thermoplastic material to be assembled into a laminate with a thin coat of an inert anti-adhesive, assembling the sheets into the laminate, holding the laminated sheets together along their edges against shifting, forming the laminate while hot to the desired shape, cooling the formed laminate, reinforcing at least the edges of the outer sheets with ribs to prevent deformation, removing the inner sheet, reassembling the reinforced outer sheets by positioning peripheral spacer elements of the thickness of the removed inner sheet between the inner surfaces of the superimposed reinforced sheets, and holding the edges of the superimposed reinforced sheets together to thereby form a mold for casting a canopy substantially identical in shape and thickness to the removed inner sheet.

ROBERT S. AMES.

References Cited in the file of this patent

UNITED STATES PATENTS

| Number | Name | Date |
| --- | --- | --- |
| 2,270,185 | Dulmage | Jan. 13, 1942 |
| 2,364,870 | Otto | Dec. 12, 1944 |

FOREIGN PATENTS

| Number | Country | Date |
| --- | --- | --- |
| 271,192 | Great Britain | May 26, 1927 |